United States Patent [19]
Sneddon et al.

[11] Patent Number: 5,469,701
[45] Date of Patent: Nov. 28, 1995

[54] FLUID STORAGE AND EXPULSION SYSTEM

[75] Inventors: Kirk Sneddon, Sayville, N.Y.; Harold Brandmaier, Harrington Park, N.J.

[73] Assignee: Arde, Inc., Norwood, N.J.

[21] Appl. No.: 119,356

[22] Filed: Sep. 10, 1993

[51] Int. Cl.⁶ ................................................ F02K 9/44
[52] U.S. Cl. ............................ 60/259; 137/264; 222/137
[58] Field of Search ............................ 60/252, 257, 259; 137/255, 264; 222/135, 136, 137, 139, 253, 255, 275, 276, 386, 389

[56] References Cited

U.S. PATENT DOCUMENTS

| | | |
|---|---|---|
| 2,874,539 | 2/1959 | Fox . |
| 3,216,621 | 11/1965 | Versaw et al. . |
| 3,296,803 | 1/1967 | Kroekel . |
| 3,533,232 | 10/1970 | Hodgson ................................ 60/252 |
| 3,668,868 | 6/1972 | Krzycki . |
| 3,675,821 | 7/1972 | Morane et al. ...................... 222/137 |
| 3,827,607 | 8/1974 | Schultz ................................ 222/389 |
| 3,945,203 | 3/1976 | Kayser ................................. 60/259 |
| 4,723,736 | 2/1988 | Rider . |
| 5,209,376 | 5/1993 | Dirksing ............................. 222/137 |

Primary Examiner—Louis J. Casaregola
Attorney, Agent, or Firm—Cohen, Pontani, Lieberman, Pavane

[57] ABSTRACT

A fluid storage and expulsion system having a rigid tank, the tank having two propellant chambers and two independently operable piston assemblies slidable in their propellant chambers for expelling propellant. In a first embodiment, a coaxial fluid storage expulsion system having inner and outer pistons is provided. Accordingly, the inner piston is provided which is slidable in an inner annular space for expelling fluid therein through a second opening. As well, an outer piston is provided which is slidable in an outer annular space for expelling a second fluid through a first opening. In a further embodiment, the pistons and tanks are positioned in series. As such, the rigid tank is provided with forward and aft propellant chambers as well as forward and aft piston assemblies. A piston guide, which extends the length of the rigid tank is positioned concentrically within the tank. A pressurant is provided for moving the forward piston assembly and expelling the fluid from the forward tank through an annular space of the second aft portion of the piston guide. As well, pressurant is ported through the annular space of the forward portion of the piston guide moving the aft piston assembly and expelling the contained fluid from the aft tank.

9 Claims, 4 Drawing Sheets

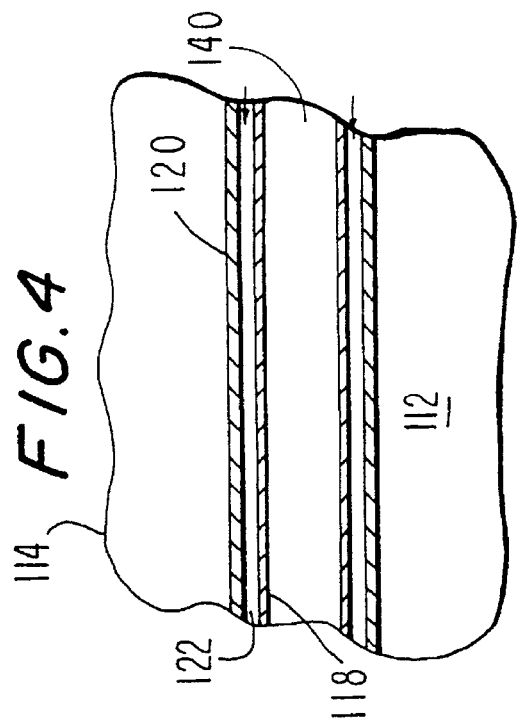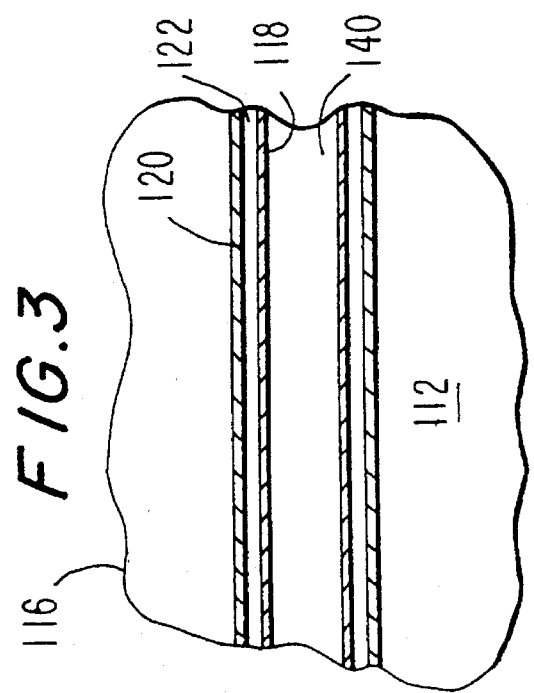

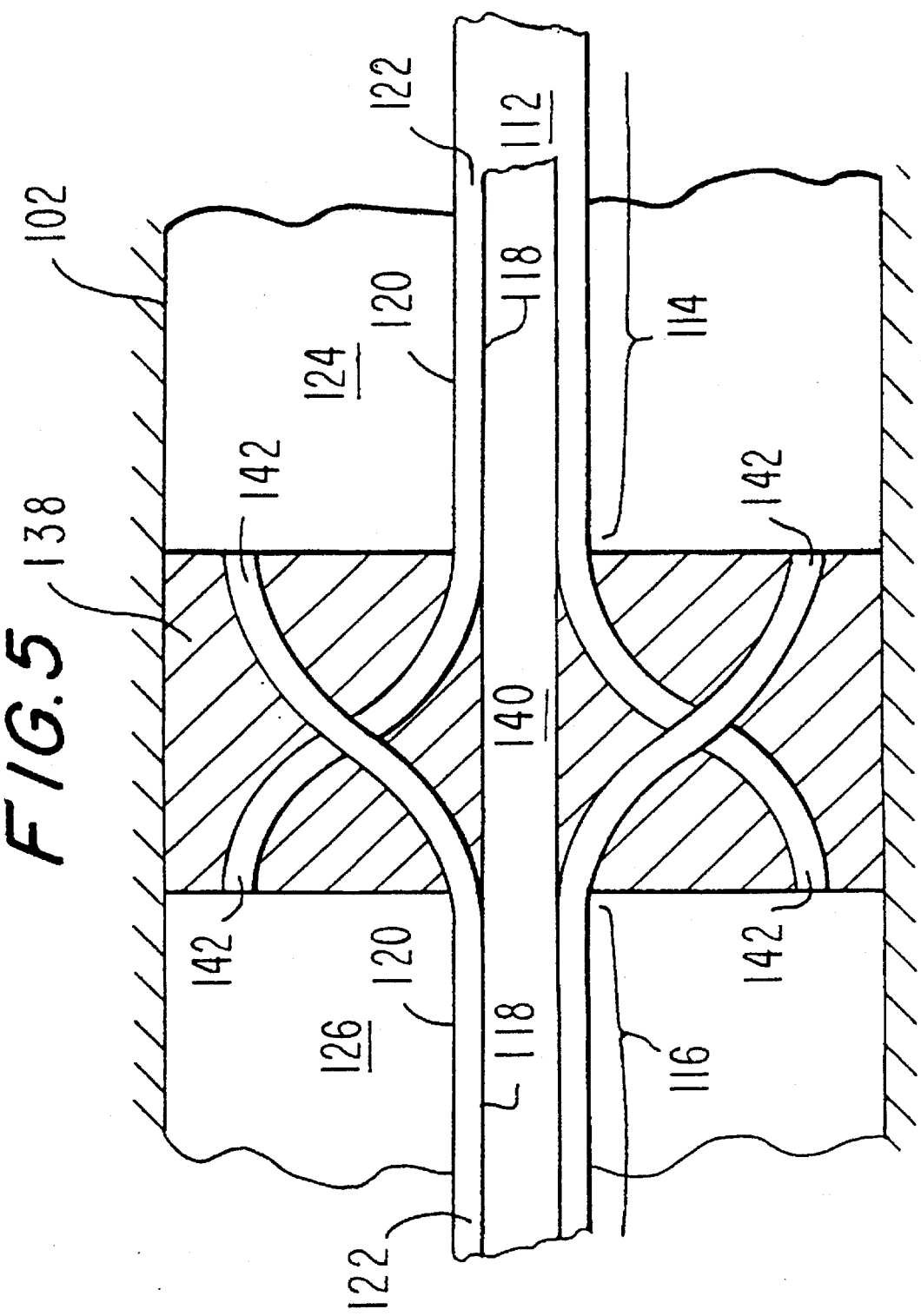

FLUID STORAGE AND EXPULSION SYSTEM

FIELD OF THE INVENTION

This invention relates generally to a fluid storage and expulsion system for use with rockets, missiles and the like, the expulsion system consisting of a longitudinally extending rigid tank having two propellant chambers and two independently operable piston assemblies slidable in the propellant chambers for expelling propellant from the respective chambers.

BACKGROUND OF THE INVENTION

The present invention relates to a piston and cylinder configuration for positive expulsion purposes. Specifically, in the field of liquid plants or the like, it has been the general practice to employ pistons with dynamic seals (i.e. O-rings or wiper seals), or rolling metal bladders or collapsing metal bladders to provide positive expulsion of propellants (i.e. fuel and oxidizer). However, such prior art devices have been unsatisfactory for various reasons. For example, rolling metal bladders having a centrally located piston guide eliminate the need for dynamic seals but present problems of piston-head cocking and rapid pressurization forces. As well, rolling metal bladders are utilized only with low length to diameter ratio application. Collapsing metal bladders present problems of metal folding and tearing, of requiring internal pressurization during storage to prevent bladder movement and fatigue, and of causing greater movement of the propulsion system center of gravity during operation than pistons or rolling metal bladders. For high Length to Diameter ratios, 3.0 to 1.0 and greater, positive expulsion piston tankage represents the most efficient solution to the aforementioned problems.

Numerous fluid storage and expulsion systems are disclosed in the art.

For example, U.S. Pat. No. 4,723,736 to Rider relates to a rocket staging system for missiles and the like wherein a carriage borne rocket engine assembly is sequentially employed within separate, generally aligned oxidizer stages which are generally coaxially disposed about the central rocket engine. In this way, a central fuel tank is surrounded by several, separate, cooperating, generally ring-shaped oxidizer tanks coaxially disposed about the rocket periphery.

U.S. Pat. No. 3,668,868 to Krzycki is directed to a prepackaged liquid rocket power plant feed system having mechanically linked pistons attached to longitudinally involuted rolling metal bladders. Specifically, each propellant tank contains a rolling metal bladder positive expulsion device in which the propellant is hermetically sealed and stored.

U.S. Pat. No. 3,216,621 to Versaw et al. relates to a storage and expulsion system wherein the maximum available storage space is utilized irrespective of tank-shaped irregularities.

U.S. Pat. No. 2,874,539 to Fox relates to a continuous combustion power plant in which the fuel and oxidizer are introduced so that gentle mixing occurs.

SUMMARY OF THE INVENTION

The present invention provides a storage and expulsion system for fluids which may include liquids, gases, slurries, gels or mixtures thereof. The system includes a rigid tank having a first and second opening, the rigid tank having an inner wall and defining a longitudinal axis. Preferably, the rigid tank may be fabricated out of aluminum, although stainless steel or a nickel alloy may be used. In order to provide stiffness with considerable weight savings, a graphite composite overwrap is preferably used.

In a first embodiment, two generally cylindrical tanks are formed one inside the other so that they are coaxial along their longitudinal axes. Specifically, a first piston guide is positioned concentrically within the rigid tank and extends along the longitudinal axis of the tank. A second piston guide is positioned concentrically between the rigid tank and the first piston guide and also extends along the longitudinal axis. The second piston guide has an inner wall and an outer wall. A first or outer annular space is formed between the inner wall of the rigid tank and the outer wall of the second piston guide. The outer annular space is in communication with a first opening. A second or inner annular space is formed between the inner wall of the second piston guide and the outer wall of the first piston guide. This inner annular space is in communication with the second opening on the rigid tank. An inner piston is slidable in the inner annular space for expelling one fluid, such as a propellant, through the second opening. Similarly, an outer piston is slidable in the outer annular space for expelling another fluid, such as an oxidizer, through the first opening. The fluid storage and expulsion system is further provided with a second pressurant delivery opening which is in communication with the inner annular space as well as a means for providing a pressurant to the inner piston to move the inner piston in the inner annular space thereby expelling fluid stored in the inner annular space through the second opening. As well, the expulsion system is provided with a first pressurant delivery opening in communication with the outer annular space to move the outer piston in the outer annular space thereby expelling fluid stored in the outer annular space through the first opening.

As indicated above, the fluid storage and expulsion system has two independently operable inner and outer pistons. In this way, pressurant may be applied to either the outer or inner piston or both at the same or different rates to move the respective pistons independently of each other.

The first piston guide is generally tubular for simplicity and efficiency in sealing. Signal wires, pressurant and/or fuel may be channeled, as desired, through this guide to other parts of the rocket or missile. Thus, the signal wires, pressurant and/or fuel do not have to be channeled around the exterior of the tank but can be retained within the internal envelope of the rigid tank.

In a second embodiment of the present invention, the fluid storage and expulsion system involves a positioning of the pistons and tanks in series or in tandem so that two generally cylindrical tanks are not coaxial but so that the tanks abut one another. The rigid tank has forward and aft fluid storage tanks or chambers as well as forward and aft piston assemblies that fit within these tanks. Similar to the embodiment described previously, a piston guide, which extends the length of the rigid tank is positioned concentrically within the tank. The piston guide, which is provided with a forward portion and an aft portion, is also provided with a inner tube and an outer tube, the outer tube being concentric to the inner tube. Accordingly, an annular space is defined between the inner tube and the outer tube.

Both forward and aft propellant chambers are arranged in the rigid tank with the forward portion of the piston guide extending through the forward propellant chamber and with the aft portion of the piston guide extending through the aft propellant chamber. A forward piston assembly is slidable about the piston guide in the forward chamber for expelling a fluid from the forward chamber. Likewise, an aft piston assembly is slidable about the piston guide in the aft propellant chamber for expelling a fluid from the aft chamber.

The fluid storage and expulsion system includes a first pressurant delivery opening which is in communication with the forward propellant chamber as well as a means for providing a pressurant to the forward propellant chamber through the first pressurant delivery opening on the aft of the slidable piston. When the forward piston moves it expels fluid from the forward propellant chamber through the annular space of the aft portion of the piston guide and through the second opening. Additionally, a second pressurant delivery opening is in communication with the aft propellant tank. This opening provides a means to deliver pressurant to the aft propellant tank through the annular space of the forward portion of the piston guide.

A stationary bulkhead is provided to separate the propellant chamber and to port the fluid from the forward propellant tank into the annular space of the second aft portion of the piston guide and out through the second opening. This bulkhead is arranged between the forward and the aft propellant chambers. The bulkhead, which is typically cast of a noncorrosive metallic material, incorporates multiple channels which direct the fluid from the forward chamber into the annular space of the aft portion of the piston guide.

As discussed above with reference to the first embodiment of the present invention, both pistons, forward and aft, are slidable independently of one another. The piston guide is generally tubular in shape and provides a wire conduit as well as channels for pressurant or propellant through the rigid tank.

It is, therefore, an object of the present invention to provide a fluid storage and expulsion system which employs two chambers, each having one piston which operates independently of the other.

Another object of the invention is to provide a fluid storage and expulsion system having coaxial inner and outer pistons for expelling propellant from the respective chambers.

A further object of the invention is to provide a fluid storage and expulsion system having forward and aft propellant chambers arranged in the rigid tank with both forward and aft piston assemblies slidable about a piston guide for expelling propellant from the respective chambers.

Another object of the invention is to provide a fluid storage and expulsion system which employs two separate chambers while providing two separate communication paths ? ? one of which provides a fluid communication across one chamber, the other of which provides fluid or power/signal communication across both chambers.

Another object of the invention is to provide a coaxial fluid storage and expulsion system which provides the least restrictive flow path when highly viscous fluids such as gels are used as propellants.

A further object of the invention is to provide an integral tank structure so that the outer surface of the propellant tank is also the outer surface of the missile or vehicle.

An additional object of the invention is to provide a tubular internal piston guide so that power and/or signal wires may be passed through the center of the tank and do not have to be passed around the external envelope of the rigid tank.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 3 is a cross sectional side view of a piston guide of the expulsion system in the forward chamber as shown in FIG. 2;

FIG. 4 is a cross sectional side view of a piston guide means of the expulsion system in the aft chamber as shown in FIG. 2; and FIG. 5 is a cross sectional view of a bulkhead of the expulsion system as shown in FIG. 2.

DETAILED DESCRIPTION OF THE PREFERRED EMBODIMENTS

The fluid storage and expulsion system of the present invention may be used with rockets, missiles or other vehicles or devices which requires dedicated positive expulsion and the like, and includes a rigid tank having two propellant chambers and two independently operable piston assemblies for expelling propellant from the respective tanks. Any fluid may be stored in the system disclosed herein, such as, for example, a liquid, a gas, a gel, a suspension of solids, or a mixture of any one or more of these.

In a first embodiment, a first piston guide is positioned within and concentrically with the rigid tank and extends along the longitudinal axis. A second piston guide is positioned concentrically between the rigid tank and the first piston guide and extends along the longitudinal axis. Thus, the rigid tank, the first piston guide, and the second piston guide are coaxial. The second piston guide has an inner wall and an outer wall. This outer annular space is located between the inner wall of the rigid tank and the outer wall of the second piston guide is in communication with the first opening. An inner annular space, which is in communication with the second opening, is defined between the inner wall of the second piston guide and the outer wall of the first piston guide. An inner piston is slidable in the inner annular space for expelling fluid through the second opening with an outer piston being slidable in the outer annular space for expelling fluid through the first opening.

Figure 1:
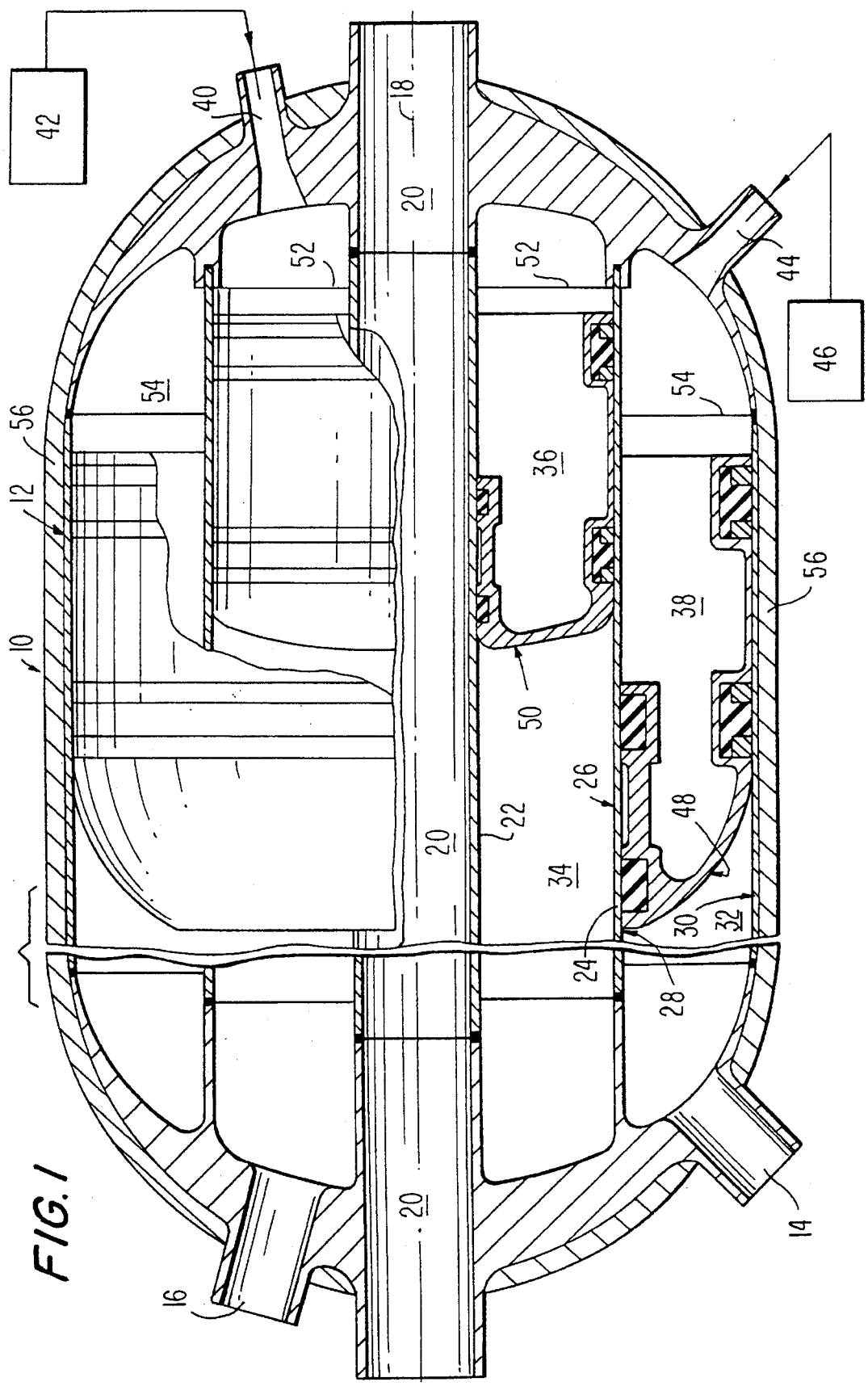
FIG. 1 is an sectioned side view of a fluid storage and expulsion system the lower half is a cross-section on the outer line and the upper half shown in cut-a-way to illustrate the outer surface of the piston in accordance with the teachings of the present invention.

Referring specifically to FIG. 1 which depicts a preferred embodiment of the fluid storage and expulsion system 10 in accordance with the present invention, a rigid tank 12 has a first opening 14 and a second opening 16. The rigid tank 12 has a longitudinal axis 18. A first piston guide or wire channel 20 is positioned concentrically within the rigid tank 12 and extends along the longitudinal axis 18, defining the first piston guide 20 which has an outer wall 22. This first piston guide 20 is preferably cylindrical and is provided with an opening so that signal wires, pressurants, (Nitrogen, Helium or $N_2H_2NCH_3$), fuel ($N_2H_3CH_3$), oxidizers ($N_2O_4$) and/or cooling fluids may communicate through the channel as desired.

A second piston guide 24 is positioned concentrically with the rigid tank 12 and is placed between rigid tank 12 and the first piston guide 22. The second piston guide 24 extends along the longitudinal axis 18 and has an inner wall 26 and an outer wall 28. An outer annular space 32 is formed between the inner wall of the rigid tank 30 and the outer wall 28 of the second piston guide 24. The outer annular space 32 is in communication with the first opening 14 of the rigid tank 12. An inner annular space 34 is defined between the inner wall 26 of the second piston guide 24 and the outer wall 22 of the first piston guide 20. The inner annular space 34 is in communication with the second opening 16 of the rigid tank 12. An inner piston 36, which is slidable in the inner annular space 34 and described below, is provided for expelling fluid through the second opening 16. Additionally, an outer piston 38, which is slidable in the outer annular space 32 and is described below, is provided for expelling fluid through the first opening 14.

The fluid storage and expulsion system further includes a first pressurant delivery opening 40 which is in communication with the inner annular space 34. As well, means 42 for providing a pressurant 42 to the inner piston 36 and for moving the inner piston 36 in the outer annular space 34 to expel fluid therein through the second opening 16 is also provided. A second pressurant delivery opening 44 which is in communication with the outer annular space 32 is also provided. A means 46 for providing a pressurant to the outer piston 38 for moving the outer piston 38 in the outer annular space 32 and for expelling fluid therein through the second opening 14 is also provided. In this way, by individually supplying pressurant, the inner piston 36 is slidable independent of the outer piston 38. Alternatively, a single means for providing pressurant to both the outer and inner annular spaces 34, 32 may be utilized.

Typically, either a cold or hot gas pressurant may be used. Cold pressurant, which may be stored in a pressurant tank, (not shown) can be either helium or nitrogen. Additionally, the hot gas pressurant may be provided via a generator in which the decomposition products of a propellant monomethyl-hydrazine $N_2H_2CH_3$ pressurant are utilized. Any typical pressurant providing apparatus is contemplated by the invention. Furthermore, any fluid may be used as a pressurant.

The rigid tank 12 is preferably fabricated of an aluminum material. However, any suitable metallic material such as stainless steel or nickel alloy may be used. As well, the rigid tank is preferably provided with a graphite fiber overwrap 56 to provide stiffness to the rigid tank. As graphite fiber overwrap 56 is lighter than the metallic material used to form the tank, a significant weight savings is achieved. Alternatively, any composite overwrap which provides a very stiff cylinder wall is contemplated. Although not depicted in any of the drawings, more than one rigid tank may be employed in an end to end fashion.

The operation of the fluid storage and expulsion system 10 can be now explained. As set forth above, the rigid tank 12 defines an inner annular space 34 and an outer annular space 32. The inner annular space 34 typically contain a fuel such as $N_2H_3CH_3$, while the outer annular space 32 contains an oxidizer, preferably $N_2O_4$. However, any type fuel or oxidizer including propellants in a gel form may be used.

As shown in FIG. 1, a shear seal 48 separates the oxidizer contained in the outer annular space 32 from the outer piston 38. Similar to the shear seal disclosed in the application entitled "Fluid Storage Tank Employing A Shear Seal" filed on even date and incorporated herein by reference, this shear seal 48 is typically fabricated of a metal material which surrounds the head of the piston 38 and is welded to the inner wall housing 30 and the outer wall of the second piston guide 28 and thereby prevents oxidizer leakage during storage. Likewise, separating the inner annular space 34 from the inner piston 36, a similar seal 50 is provided.

In operation, pressurant is supplied via a pressurant supply means 42 through the first delivery opening 40. Pressurant is supplied via a first pressurant supply means 46 through the first delivery opening 44. In this way, pressurant acts on the backsides 52, 54 of the inner and outer pistons 36, 38 displacing the inner and outer pistons 36, 38 and thereby causing the respective shear seals 40, 48 to rupture. Accordingly, oxidizer contained in the outer annular space 32 is expelled through the first opening 14 while fuel contained in the inner annular space 34 is expelled through the second opening 16. Both the fuel and oxidizer are driven out of their respective chambers and into an engine (not shown) for combustion.

An alternate embodiment of the fluid storage and expulsion system is now shown in FIGS. 2, 3, 4 and 5. In this embodiment, the pistons and tanks are positioned in series or in tandem. In this way, a rigid tank, which is provided with a first and second opening, is provided with forward and aft propellant chambers as well as forward and aft piston assemblies.

Figure 2:
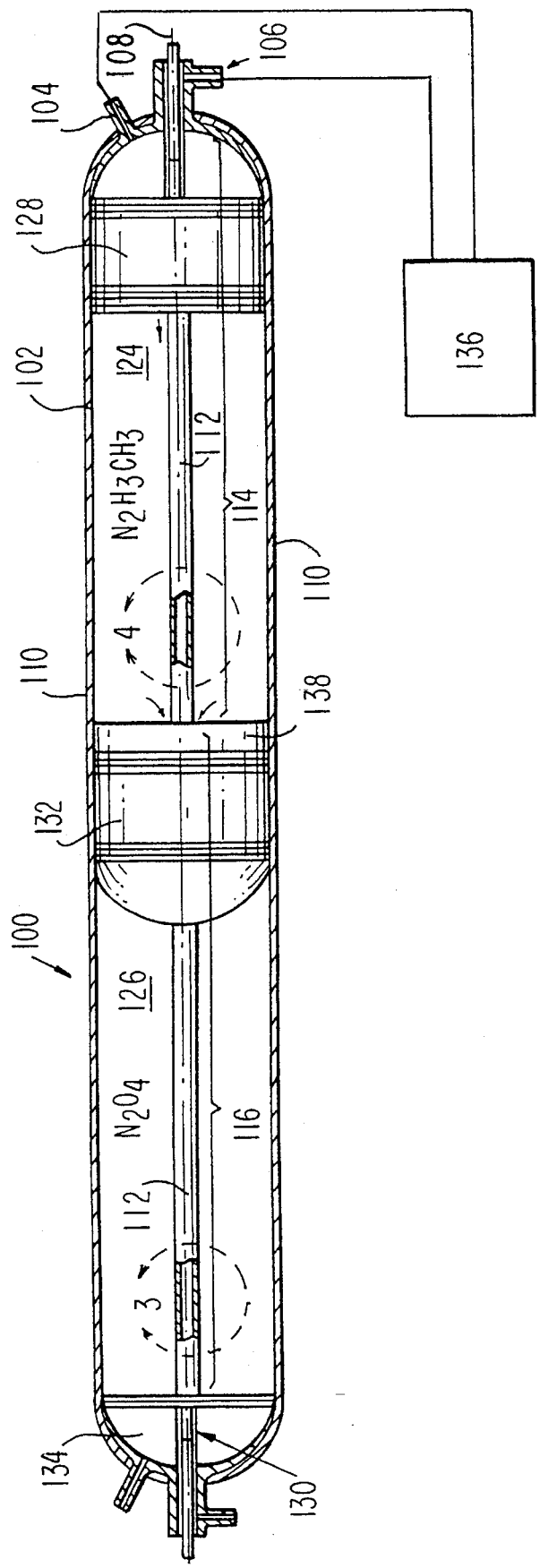
FIG. 2 is a cross sectional side view of a further embodiment of a fluid storage and expulsion system.

Referring to FIG. 2, a fluid storage and expulsion system 100 in accordance with the present invention includes a rigid propellant storage tank 102 having a first opening 104 and a second opening 106, with the rigid tank 102 defining a longitudinal axis 108. Similar to the embodiment shown in FIG. 1, the rigid tank 102 is generally cylindrical in shape, circular in cross-section and is preferably fabricated out of an aluminum material. However, any suitable metallic material such as stainless steel or nickel alloy may be used. As well, the rigid tank 102 is provided with a graphite fiber overwrap 110 to provide stiffness. As the graphite fiber overwrap 110 is lighter than the metallic material used to form the tank 102, a significant weight savings is achieved. Although graphite fiber 110 is preferred, any composite overwrap which provides a stiff cylinder wall can be used.

As shown in FIG. 2, a piston guide 112 is positioned within and concentrically with the rigid tank 102 and extends the length of the rigid tank 102. The piston guide 112 has a forward portion 114 and an aft portion 116. As shown in FIGS. 3 and 4, the piston guide 112 is provided with an inner tube 118 and a outer tube 120. The outer tube 120 is concentric to the inner tube 118 and thereby defines an annular space 122 between the inner tube 118 and the outer tube 120. This piston guide 112 is preferably cylindrical and is provided with a tubular channel 140 so that signal wires and/or fluids may travel through it. As well, pressurants, as well as fuel ($N_2H_3CH_3$), or oxidizer ($N_2O_4$) may be ported through the tubular channel 140 if desired. Although $N_2H_3CH_3$ and $N_2O_4$ is preferably disclosed, any suitable fuel or oxidizer may be used.

Also as shown in FIG. 2, the fluid storage and expulsion system 100 is provided with both a forward propellant chamber 124 and an aft propellant chamber 126 which are arranged in the rigid tank 102. The forward portion of the piston guide 114 extends through the forward propellant chamber 124, while the aft portion of the piston guide 116 extends through the aft propellant chamber 126. A forward piston 128 is slidable about the piston guide 112 in the forward chamber 124 for expelling fluid from the forward propellant chamber 124. Accordingly and as shown in FIG. 4, fluid is expelled through the annular space 122 of the aft portion 116 of the piston guide 112 and through the second opening 130. As well, an aft piston 132 is slidable about the piston guide 112 in the aft propellant chamber 126 for expelling fluid through a first opening 134.

Additionally, FIG. 2 shows a first pressurant delivery opening 104 which is in communication with the forward propellant chamber 124 on the aft side of the piston. As well, means 136 provides a pressurant to the forward propellant tank 124 through the first pressurant delivery opening 104. This pressurant means 136 is similar to the pressurant means 42, 46 described above with reference to the embodiment of the present invention shown in FIG. 1. Accordingly, when pressurant is provided to the forward propellant chamber 124, the forward piston then moves, thereby expelling fluid through the annular space 122 of the second aft portion 116 of the piston guide and through the second opening 130. As well, a second pressurant delivery opening 106 is in communication with the aft propellant chamber 126 on the aft side of the piston.

Additionally, means 136 for providing a pressurant to the aft propellant chamber 126 is provided. Specifically, pressurant is provided through the second pressurant delivery opening 106 and through the annular space 122 of the forward portion of the piston guide 114. Thereafter, pressurant acts on the aft piston 132 thereby moving the aft piston 132 and expelling fluid therein through the first opening 134. In this way, the aft piston 132 is slidable independently of the forward piston 128.

A ported bulkhead 138 is located between the forward propellant chamber 124 and the aft propellant chamber 126. This bulkhead 138 directs the fluid from the forward propellant tank 124 into the annular space 122 of the aft portion 116 of the piston guide 112. The bulkhead 138 also directs the pressurant from the annular space 122 of the forward portion 114 of the piston guide 112. This bulkhead 138 may be cast of a metallic material and is provided with a multitude of ports or channels 142, as shown in FIG. 5.

In operation, pressurant is supplied via the means 136 for providing pressurant to the first opening 104 and the second opening 106 on the forward side of the rigid tank 110. The pressurant causes the forward piston 128 to displace the fluid in the forward propellant chamber 124 which is thereby ported through the bulkhead 138. The bulkhead 138 ports the fluid into the annular space 122 of the aft portion 116 of the piston guide 112 and out through the second opening 130. Similarly, pressurant, which is applied through the second opening 106, is provided to the aft piston 132 via the annular space 122 of the forward portion of the piston guide 114 through the bulkhead 138 to act upon the aft piston 132, thereby displacing the fluid in the aft propellant chamber 126 out of the first opening 134.

Referring to FIG. 3, the forward portion 114 of the piston guide 112 is shown. Specifically, this forward portion 114 is provided with an inner tube 118 and an outer tube 120. The outer tube 120 is concentric with the inner tube 118 and thereby defines an annular space 122 between the inner tube 118 and the outer tube 120. This piston guide 112 is preferably cylindrical and is provided with a tubular opening 140 so that signal wires and/or fluids may travel through it. The annular space 122 of the forward portion 114 of piston guide 112 is utilized to transport pressurant from the means for providing pressurant 136 to the aft piston 132.

FIG. 4 shows the aft portion 116 of the piston guide 112. This aft portion of the piston guide 116 is also provided with an inner tube 118 and an outer tube 120. The outer tube 120 is concentric with the inner tube 118 and thereby defines an annular space 122 between the inner tube 118 and the outer tube 120. This piston guide 112 is also preferably cylindrical and is provided with a tubular opening 140 so that signal wires and/or fluids may travel through it. The annular space 122 of the aft portion 116 of piston guide 112 is utilized to transport fluid from the forward propellant tank 124 to second opening 130.

FIG. 5 shows the bulkhead 138 which may be fabricated of or cast from a metallic material. Specifically, the bulkhead 138 has a multitude of ports or channels 142 which act to direct both the fluid from the forward chamber 124 into the annular space 122 of the aft portion of the piston guide 116, as well as to direct pressurant from the annular space 122 of the first forward portion of the piston guide 114 to displace the aft piston 132.

While there have been shown and described and pointed out fundamental novel features of the invention as applied to preferred embodiments thereof, it will be understood that various omissions and substitutions and changes in the form and details of the device illustrated, and in its operation, may be made by those skilled in the art without departing from the spirit of the invention. It is the intention, therefore, to be limited only as directed by the scope of the claims appended hereto.

What is claimed is:

1. A fluid storage and expulsion system comprising:

a rigid tank defining first and second openings, said rigid tank having an inner wall and defining a longitudinal axis;

a first piston guide positioned concentrically within said rigid tank and extending along said longitudinal axis, said first piston guide having an outer wall;

a second piston guide positioned concentrically between said rigid tank and said first piston guide and extending along said longitudinal axis, said second piston guide having an inner wall and an outer wall and defining a concentric outer annular space between the inner wall of said rigid tank and the outer wall of said second piston guide and an inner annular space between the inner wall of said second piston guide and the outer wall of said first piston guide, said outer annular space communicating with said first opening and said inner annular space communicating with said second opening;

an inner piston slidable in said inner annular space for expelling fluid therein through said second opening; and an outer piston slidable in said outer annular space independently of said inner piston for expelling fluid in said outer annular space through said first opening.

2. The fluid storage and expulsion system of claim 1, wherein said second opening is on one side of said inner piston; wherein said rigid tank has a first pressurant delivery opening on the other side of said inner piston in communication with said inner annular space, and means for providing a pressurant through said first pressurant delivery opening to said inner annular space for moving said inner piston in said inner annular space for expelling fluid therein through said second opening.

3. The fluid storage and expulsion system of claim 2, wherein said first opening is on one side of said outer piston; and said rigid tank has a second pressurant delivery opening in communication with said outer annular space, said system further comprising means for providing a pressurant through said pressurant delivery opening to said outer annular space for moving said outer piston in said outer annular space for expelling fluid therein through said first opening.

4. The fluid storage and expulsion system of claim 1, wherein said first piston guide further comprises a longitudinally extending channel.

5. The fluid storage and expulsion system of claim 1, wherein said rigid tank comprises aluminum.

6. The fluid storage and expulsion system of claim 1, wherein said rigid tank further comprises a graphite fiber overwrap.

7. The fluid storage and expulsion system of claim 3, wherein said fluid further comprising a fluid in said inner annular space on said one side of said inner piston, and is a fuel.

8. The fluid storage and expulsion system of claim 7, further comprises a fluid in said outer annular space on said one side of said outer piston, and wherein said fluid is an oxidizer.

9. The fluid storage and expulsion system of claim 1, wherein said rigid tank has a circular cross-section.

\* \* \* \* \*